(12) United States Patent
Huang et al.

(10) Patent No.: US 12,535,371 B2
(45) Date of Patent: Jan. 27, 2026

(54) TEMPERATURE AND PRESSURE SENSORS WITH DIFFERENT TEMPERATURE COEFFICIENTS OF RESISTANCE AND ELECTRONIC DEVICE

(71) Applicant: SHENZHEN NEW DEGREE TECHNOLOGY CO., LTD., Guangdong (CN)

(72) Inventors: Tuoxia Huang, Guangdong (CN); Hao Li, Guangdong (CN)

(73) Assignee: SHENZHEN NEW DEGREE TECHNOLOGY CO., LTD., Shenzhen (CN)

( * ) Notice: Subject to any disclaimer, the term of this patent is extended or adjusted under 35 U.S.C. 154(b) by 397 days.

(21) Appl. No.: 18/027,013

(22) PCT Filed: Sep. 18, 2020

(86) PCT No.: PCT/CN2020/116239
§ 371 (c)(1),
(2) Date: Mar. 17, 2023

(87) PCT Pub. No.: WO2022/056850
PCT Pub. Date: Mar. 24, 2022

(65) Prior Publication Data
US 2023/0366757 A1 Nov. 16, 2023

(51) Int. Cl.
*G01L 1/22* (2006.01)
*G01K 7/16* (2006.01)

(52) U.S. Cl.
CPC . *G01L 1/22* (2013.01); *G01K 7/16* (2013.01)

(58) Field of Classification Search
CPC ... G01L 1/2281; G01L 1/2268; G01L 1/2262; G01L 9/045; G01L 9/065; G01L 9/025;
(Continued)

(56) References Cited

U.S. PATENT DOCUMENTS 3,808,469 A * 4/1974 Raymond ............... G01K 1/20
219/505
3,831,042 A * 8/1974 La Claire ............... G12B 7/00
219/505
(Continued)

FOREIGN PATENT DOCUMENTS

CN 101029838 9/2007
CN 101526404 9/2009
(Continued)

OTHER PUBLICATIONS

International Search Report dated Jun. 23, 2021, for PCT/CN2020/116239, 7 pp.
(Continued)

*Primary Examiner* — Tran M. Tran
(74) *Attorney, Agent, or Firm* — Nixon & Vanderhye, P.C.

(57) ABSTRACT

A temperature and pressure sensor includes: a substrate, a first sensing resistor, and a second sensing resistor. The substrate has multiple pressure sensing areas and multiple temperature sensing areas. Two opposite surfaces of each pressure sensing area are respectively provided with the first sensing resistors which are constituted as a pressure detection circuit. When the substrate is stressed and deformed, the first sensing resistors of the pressure sensing area may generate different deformations and different resistance changes, so that a change of an electrical signal is caused and pressure information is output. At least one surface of the temperature sensing area is provided with a first sensing resistor and a second sensing resistor which are constituted as a temperature detection circuit. The pressure detection circuit and the temperature detection circuit may detect pressure and temperature separately and independently.

15 Claims, 8 Drawing Sheets

(58) Field of Classification Search
CPC ......... G01L 9/085; G01L 19/04; G01D 21/02; G01B 7/18
USPC .................................................. 73/708, 766
See application file for complete search history.

(56) References Cited

U.S. PATENT DOCUMENTS

| | | | | |
|---|---|---|---|---|
| 3,967,188 | A * | 6/1976 | Spencer | G01L 9/045 73/766 |
| 4,262,532 | A * | 4/1981 | Butler | G01L 9/0005 374/185 |
| 4,311,980 | A * | 1/1982 | Prudenziati | G01P 15/123 338/307 |
| 4,442,718 | A * | 4/1984 | Komarova | G01L 1/2281 73/766 |
| 4,462,018 | A * | 7/1984 | Yang | G01L 9/065 338/42 |
| 4,510,813 | A * | 4/1985 | Kanazawa | G01L 1/2281 73/766 |
| 4,556,115 | A * | 12/1985 | Lockery | G01G 3/142 73/1.15 |
| 4,869,113 | A * | 9/1989 | Sarrazin | G01L 25/00 73/862.622 |
| 4,911,016 | A * | 3/1990 | Miyazaki | G01L 19/148 73/766 |
| 5,053,692 | A * | 10/1991 | Craddock | G01L 9/065 323/365 |
| 5,197,334 | A * | 3/1993 | Guziak | G01L 1/2281 73/862.623 |
| 5,343,755 | A * | 9/1994 | Huss | G01B 7/18 73/766 |
| 5,361,218 | A * | 11/1994 | Tripp | G01L 27/002 374/E15.001 |
| 5,534,773 | A * | 7/1996 | Tsugai | G01L 1/2281 324/105 |
| 5,583,295 | A * | 12/1996 | Nagase | G01L 19/04 73/114.18 |
| 5,726,564 | A * | 3/1998 | Takashima | G01P 15/123 323/907 |
| 6,098,464 | A * | 8/2000 | Avisse | G01D 3/036 324/648 |
| 6,101,883 | A * | 8/2000 | Takeuchi | G01L 9/06 73/754 |
| 6,329,825 | B1 * | 12/2001 | Tanaka | G01L 9/065 73/1.88 |
| 6,433,524 | B1 * | 8/2002 | Yang | G01R 17/105 323/288 |
| 6,598,484 | B2 * | 7/2003 | Tanizawa | G01L 1/2281 73/754 |
| 6,700,473 | B2 * | 3/2004 | Kurtz | G01L 9/0055 338/42 |
| 6,729,187 | B1 * | 5/2004 | Gregory | H01C 7/06 73/765 |
| 6,810,745 | B2 * | 11/2004 | Makino | G01L 1/2281 73/708 |
| 6,862,937 | B2 * | 3/2005 | Fujita | G01L 1/2281 73/766 |
| 6,957,584 | B2 * | 10/2005 | Jackson | G01L 1/2281 73/765 |
| 6,973,837 | B2 * | 12/2005 | Barnett | G01L 1/2256 73/765 |
| 7,007,551 | B2 * | 3/2006 | Zdeblick | A61B 5/412 73/715 |
| 7,051,595 | B2 * | 5/2006 | Kwon | G01L 9/065 73/708 |
| 7,284,441 | B2 * | 10/2007 | Zdeblick | A61N 1/3627 73/753 |
| 7,304,484 | B2 * | 12/2007 | Braun | G01L 1/2281 324/706 |
| 7,398,688 | B2 * | 7/2008 | Zdeblick | G01L 9/065 73/700 |
| 7,647,837 | B2 * | 1/2010 | Moran | G01G 3/1418 73/766 |
| 7,918,137 | B2 * | 4/2011 | Kurtz | G01L 9/065 73/726 |
| 8,596,137 | B2 * | 12/2013 | Mathias | F02K 9/346 702/155 |
| 9,016,135 | B2 * | 4/2015 | Huber | G01D 3/0365 73/779 |
| 9,234,768 | B2 * | 1/2016 | Pradhan | G01L 27/002 |
| 10,054,502 | B2 * | 8/2018 | Nezuka | G01L 9/045 |
| 10,101,145 | B2 * | 10/2018 | Fahimi | G01D 3/036 |
| 10,338,719 | B2 * | 7/2019 | Li | G06F 21/32 |
| 10,352,799 | B2 * | 7/2019 | Li | G01L 9/0054 |
| 10,386,251 | B2 * | 8/2019 | Klemm | G01L 1/18 |
| 10,444,091 | B2 * | 10/2019 | Hu | G06F 3/04144 |
| 10,473,544 | B2 * | 11/2019 | Schaust | G01L 1/2262 |
| 10,782,196 | B2 * | 9/2020 | Caltabiano | G01L 9/0054 |
| 10,791,589 | B2 * | 9/2020 | Krumbein | G01L 19/0092 |
| 10,816,416 | B2 * | 10/2020 | Li | G01L 1/18 |
| 10,935,443 | B2 * | 3/2021 | Li | G01L 1/14 |
| 11,009,477 | B2 * | 5/2021 | Le Neel | G01K 7/20 |
| 11,099,093 | B2 * | 8/2021 | Potasek | G01L 9/065 |
| 11,156,510 | B2 * | 10/2021 | Li | G01L 1/205 |
| 11,248,967 | B2 * | 2/2022 | Li | G01B 7/18 |
| 11,287,347 | B2 * | 3/2022 | Szasz | G01L 9/045 |
| 11,422,049 | B2 * | 8/2022 | Matsunami | G01D 3/08 |
| 11,460,360 | B2 * | 10/2022 | Suresh | G01L 5/1627 |
| 11,499,877 | B2 * | 11/2022 | Misaizu | G01L 1/22 |
| 11,653,568 | B2 * | 5/2023 | Haroun | H01L 25/16 257/417 |
| 11,680,856 | B2 * | 6/2023 | Vergauwen | G01L 9/04 73/862.622 |
| 11,768,121 | B2 * | 9/2023 | Potasek | G01L 27/002 73/753 |
| 11,913,925 | B2 * | 2/2024 | Lo | G01L 9/125 |
| 11,965,789 | B2 * | 4/2024 | Suresh | G01L 1/2287 |
| 12,055,451 | B2 * | 8/2024 | Li | G01L 5/1627 |
| 12,078,559 | B2 * | 9/2024 | Li | G01L 1/2293 |
| 12,203,819 | B2 * | 1/2025 | Tsai | G01L 1/2281 |
| 12,298,193 | B2 * | 5/2025 | Suresh | G01L 1/2281 |
| 2002/0083776 | A1 * | 7/2002 | Tanizawa | G01L 9/065 73/753 |
| 2006/0207339 | A1 * | 9/2006 | Sumigawa | G01B 7/18 73/777 |
| 2010/0277223 | A1 * | 11/2010 | Mirow | G05F 3/08 327/513 |
| 2012/0241822 | A1 * | 9/2012 | Takenaka | G01L 9/0055 257/254 |
| 2013/0222306 | A1 * | 8/2013 | Aberg | G01L 1/2281 374/185 |
| 2014/0088890 | A1 * | 3/2014 | Hao | G01L 9/125 73/708 |
| 2018/0172532 | A1 | 6/2018 | Huang et al. | |
| 2019/0094007 | A1 * | 3/2019 | Li | G01L 9/02 |
| 2019/0145834 | A1 * | 5/2019 | Nakamura | G01K 7/16 374/164 |
| 2019/0310212 | A1 * | 10/2019 | Ando | G01N 25/64 |
| 2024/0077366 | A1 * | 3/2024 | Ito | H01L 22/34 |

FOREIGN PATENT DOCUMENTS

| | | |
|---|---|---|
| CN | 202304895 | 7/2012 |
| CN | 104204749 | 12/2014 |
| CN | 108603799 | 9/2018 |
| CN | 111397776 | 7/2020 |

OTHER PUBLICATIONS

Written Opinion of the ISA dated Jun. 23, 2021, for PCT/CN2020/116239, 3 pp.

* cited by examiner

TEMPERATURE AND PRESSURE SENSORS WITH DIFFERENT TEMPERATURE COEFFICIENTS OF RESISTANCE AND ELECTRONIC DEVICE

CROSS-REFERENCE TO RELATED APPLICATION

This application is a 35 U.S.C. § 371 national stage application of PCT patent application No. PCT/CN2020/116239, filed on Sep. 18, 2020, the entire contents of which are incorporated herein by reference.

FIELD

The present application relates to the field of temperature detection and pressure detection, and particularly to a temperature and pressure sensor and an electronic device.

BACKGROUND

At present, a device for temperature detection and a device for pressure detection are separated from each other, and they are a temperature detection device and a pressure detection device, respectively. In some occasions where temperature and pressure need to be detected, the two kinds of detection devices need to be arranged on an object to be detected, such that the structure and the volume of the two kinds of detection devices are large, and it is inconvenient to assemble and use the two kinds of detection devices.

SUMMARY

One objective of the embodiments of the present application is to provide a temperature and pressure sensor and an electronic device, in order to solve a technical problem in the prior art that both a temperature detection device and a pressure detection device need to be assembled on an object to be detected, so that the electronic device is large in the structure and the size, and it is inconvenient to use the electronic device.

The technical solutions used in the embodiments of the present application are described below:

In the first aspect, a temperature and pressure sensor is provided. The temperature and pressure sensor includes a substrate, a plurality of first sensing resistors and a plurality of second sensing resistors. The first sensing resistors and the second sensing resistors have a same gage factor and different temperature coefficients of resistance. The substrate is provided with at least one pressure sensing area and at least one temperature sensitive area.

Two opposite surfaces of each pressure sensing area are provided with at least one first sensing resistor respectively, and the first sensing resistors located in the pressure sensing area are constituted as a pressure detection circuit.

At least one surface of each temperature sensing area is provided with at least one first sensing resistor and at least one second sensing resistor which are adjacent to each other. The first sensing resistor and the second sensing resistor located in the temperature sensing area are constituted as a temperature detection circuit.

In the second aspect, a temperature and pressure sensor is provided. The temperature and pressure sensor includes a substrate, a plurality of first sensing resistors and a plurality of second sensing resistors. The first sensing resistors and the second sensing resistors have different gage factors and different temperature coefficients of resistance. The substrate is provided with a plurality of pressure sensing areas and a plurality of temperature sensitive areas.

Two opposite surfaces of each pressure sensing area are respectively provided with at least one first sensing resistor, and the first sensing resistors located in the pressure sensing area are constituted as a pressure detection circuit.

At least one surface of each temperature sensing area is provided with at least one first sensing resistor and at least one second sensing resistor which are adjacent to each other. The first sensing resistor and the second sensing resistor located in the temperature sensing area are constituted as a temperature detection circuit.

In the third aspect, an electronic device is provided, the electronic device includes an object to be detected and the aforesaid temperature and pressure sensor. The substrate is arranged to abut against a surface of the object to be detected.

The temperature and pressure sensor according to the embodiments of the present application has the following beneficial effects: in the temperature and pressure sensor, the substrate has at least one pressure sensing area and at least one temperature sensing area. The two opposite surfaces of each pressure sensing area are respectively provided with at least one first sensing resistor, the first sensing resistors are constituted as a pressure detection circuit. When temperature is changed, since the first sensing resistors in the pressure sensing area have the same temperature coefficient of resistance, so that the output electrical signal is invariable. When the substrate is stressed and a bending deformation of the substrate is generated, the first sensing resistors on the two surfaces of the pressure sensing area will generate different deformations, so that different resistance changes are generated, a change of the electrical signal is caused, and the pressure information is output.

At least one surface of the temperature sensing area is provided with a plurality of first sensing resistors and a plurality of second sensing resistors, the first sensing resistors and the second sensing resistors are constituted as the temperature detection circuit. When ambient temperature are changed, since the first sensing resistor and the second sensing resistor have different temperature coefficients of resistance, different resistance changes may be generated, so that the change of the electrical signal may be caused, and the temperature information is output. When the substrate is stressed and deformed, since the first sensing resistor and the second sensing resistor on the same surface of the temperature sensing area are arranged to be adjacent to each other, the first sensing resistor and the second sensing resistor have the same deformation, so that the output electrical signal is substantially invariable. In the temperature and pressure sensor, the pressure detection circuit and the temperature detection circuit may detect pressure and temperature separately and independently, the temperature and pressure sensor has a compact structure and is small in size, and thus it is convenient to use the temperature and pressure sensor.

The electronic device according to the embodiments of the present application has the following beneficial effects: in the electronic device, the substrate in the temperature and pressure sensor is abutted against the object to be detected, so that the substrate can be deformed with the deformation of the object to be detected. Pressure and temperature are separately and independently detected through the pressure detection circuit and the temperature detection circuit in the temperature and pressure sensor, so that the temperature and pressure sensor has a compact structure and is small in size, and thus it is convenient to use the temperature and pressure sensor.

BRIEF DESCRIPTION OF THE DRAWINGS

In order to describe the embodiments of the present application more clearly, a brief introduction regarding the accompanying drawings that need to be used for describing the embodiments or exemplary technology of the present application is given below. It is apparent that, the accompanying drawings described below are only some embodiments of the present application. A person of ordinary skill in the art may also obtain other drawings according to the current drawings without paying creative labor.

DETAILED DESCRIPTION OF EMBODIMENTS

In order to make the technical problems, the technical solutions and the beneficial effects of the present application be clearer and more understandable, the present application will be further described in detail below with reference to the embodiments. It should be understood that the embodiments described herein are only intended to illustrate but not to limit the present application.

In the description of the present application, it needs to be understood that, directions or location relationships indicated by terms such as "length", "width", "up", "down", "front", "rear", "left", "right", "vertical", "horizontal", "top", "bottom", "inside", "outside", and so on are the directions or location relationships shown in the accompanying figures, and are only intended to describe the present application conveniently and are for the purpose of conciseness of the description, but should not be interpreted as indicating or implying that a device or a component indicated by the terms must have specific locations and be constructed and manipulated according to the specific locations. Therefore, these terms shouldn't be considered as limitation to the present application.

In addition, terms such as "the first" and "the second" are only used for the purpose of illustration, and thus should not be considered as indicating or implying any relative importance, or implicitly indicating the number of indicated technical features. Thus, technical feature(s) restricted by "the first" or "the second" can explicitly or implicitly comprise one or more such technical feature(s). In the description of the present application, a term "a plurality of" has the meaning of at least two, unless otherwise there is additional explicit and specific limitation for the term of "a plurality of".

In the present application, unless there is additional explicit stipulation and limitation, terms such as "mount", "connect with each other", "connect", "fix", and so on should be generalizedly interpreted. For example, "connect" may be interpreted as being fixedly connected, detachably connected, or connected integrally; "connect" can also be interpreted as being mechanically connected or electrically connected; "connect" may be further interpreted as being directly connected or indirectly connected through intermediary, or being internal communication between two components or an interaction relationship between the two components. The person of ordinary skill in the art may interpret the specific meanings of the aforementioned terms in the present application according to specific conditions.

Figure 1:
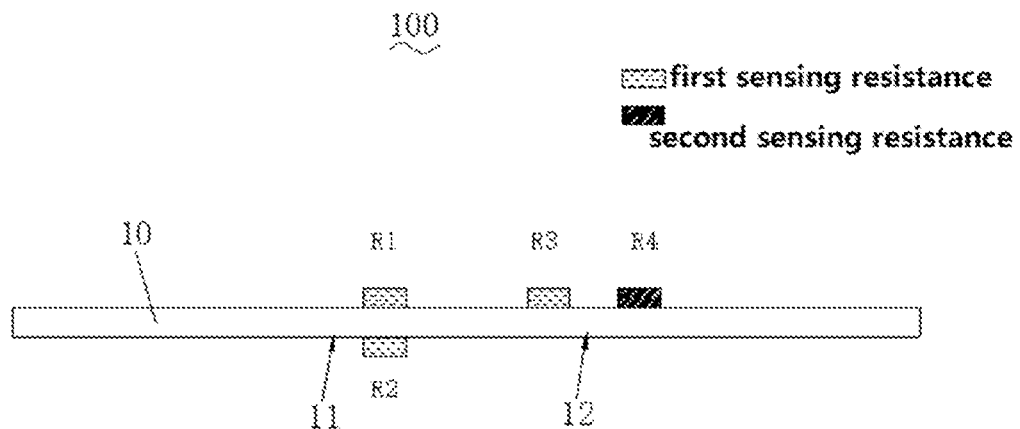
FIG. 1 illustrates a schematic structural diagram of a temperature and pressure sensor according to the embodiments of the present application.

Referring to FIG. 1 and FIG. 2, a temperature and pressure sensor 100 is provided in one embodiment of the present application, this temperature and pressure sensor 100 includes a substrate 10, first sensing resistors, and second sensing resistors. The substrate 10 may be made of a material having elastic deformation characteristics. The first sensing resistors and the second sensing resistors have the same gage factor and different temperature coefficients of resistance. The substrate 10 has at least one pressure sensing area 11 and at least one temperature sensing area 12, the pressure sensing area 11 and the temperature sensing area are regions of the substrate 10 which are divided by functions.

The two opposite surfaces of the pressure sensing area 11 are respectively provided with at least one first sensing resistor, and the first sensing resistors located in the pressure sensing area 11 are constituted as a pressure detection circuit.

At least one surface of the temperature sensing area 12 is provided with one first sensing resistor and one second sensing resistor which are adjacent to each other; and the first sensing resistor and the second sensing resistor located in the temperature sensing area 12 are constituted as a temperature detection circuit. The first sensing resistor and the second sensing resistor may be one single resistor. As an alternative, each of the first sensing resistor and the second sensing resistor is one single resistor constituted by electrically connecting a plurality of resistors in series.

Here, a gage factor (Gages Factor, abbreviated as GF hereinafter) is a sensitivity coefficient of a resistance strain gauge, that is, a ratio of a resistance change rate $\Delta R/R$ to a stress change of the surface of the object in the axial direction of the strain gauge that causes the resistance change.

Temperature coefficient of resistance (Temperature Coefficient of Resistance, abbreviated as TCR) represents the relative change of the resistance value when the temperature is changed by 1° C. The unit of the TCR is ppm/° C. The expression of the temperature coefficient of resistance is listed below:

$$K = \left(\frac{R - R_0}{R_0}\right) \bigg/ (T - T_0)$$

Where, K represents a temperature coefficient of resistance; To represents an initial temperature value; T represents a temperature value at a predetermined moment; $R_0$ represents an initial resistance value of a sensing resistor; and R represents a resistance value of the sensing resistor at the predetermined moment. In the temperature and pressure sensor 100 provided by the present application, the substrate 10 in the temperature and pressure sensor 100 has the at least one pressure sensing area 11 and the at least one temperature sensing area 12. The two opposite surfaces of each pressure sensing area 11 are respectively provided with the first sensing resistor, and the first sensing resistors arranged on the two opposite surfaces of the pressure sensing area 11 are constituted as the pressure detection circuit. When the temperature is changed, due to the fact that the first sensing resistors in the pressure sensing area 11 have the same temperature coefficient of resistance, thus, the output electrical signal is invariable. When the substrate 10 is stressed and a bending deformation of the substrate 10 is generated, the first sensing resistors on the two opposite surfaces of the pressure sensing area 11 will generate different deformations and different resistance changes are generated, so that a change of the electrical signal is caused, and pressure information is output.

At least one surface of the temperature sensing area 12 is provided with the first sensing resistor and the second sensing resistor, and the first sensing resistor and the second sensing resistor are constituted as the temperature detection circuit. When ambient temperature are changed, different resistance changes may be generated due to the fact that the temperature coefficients of resistance of the first sensing resistor and the second sensing resistor are different, the electrical signal change is caused, so that the temperature information is output. When the substrate 10 is subjected to the applied force and is deformed, since the first sensing resistor and the second sensing resistor on the same surface of the temperature sensing area 12 are arranged adjacent to each other, the first sensing resistor and the second sensing resistor have consistent deformation, so that the output electrical signal is invariable substantially. In the temperature and pressure sensor 100, the pressure detection circuit and the temperature detection circuit can detect pressure and temperature separately and independently. The temperature and pressure sensor 100 has a compact structure and is small in size, and thus it is convenient to use the temperature and pressure sensor 100.

Figure 3A:
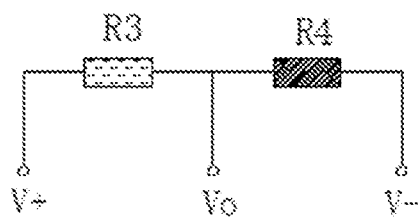
FIG. 3A-3H illustrate a schematic diagram of multiple implementations of a temperature detection unit of the temperature and pressure sensor shown in FIG. 1.

There are various optional implementations for arranging the temperature detection circuit. Referring to FIG. 1 and FIG. 3A, a first implementation of the temperature detection circuit is that: one surface of the temperature sensing area 12 is provided with a first sensing resistor $R_3$ and a second sensing resistor $R_4$, and the temperature detection circuit is a voltage dividing circuit constituted by connecting the first sensing resistor $R_3$ and the second sensing resistor $R_4$ in the temperature sensing area 12 in series.

A constant voltage source is applied, an input voltage $U_i$ is applied to a terminal V+ and a terminal V−, the potential at a terminal $V_o$ is detected, or an output voltage $U_o$ between the terminal $V_o$ and GND is measured, and an input and output voltage formula is expressed as:

$$U_o = \frac{R_4}{R_3 + R_4} U_i$$

When the temperature is changed, due to the fact that the first sensing resistor $R_3$ and the second sensing resistor $R_4$ have different temperature coefficients of resistance, different resistance changes may be generated, an electrical signal change $U_o$ is caused, so that the temperature information is output. When the substrate 10 is stressed and is deformed, due to the fact that the first sensing resistor $R_3$ and the second sensing resistor $R_4$ are arranged on the same surface of the substrate 10 and are adjacent to each other, and have the consistent deformation and the consistent gage factors, so that the output electrical signal is invariable. Due to this circuit configuration, the temperature detection circuit may not be affected by a stress deformation of the substrate 10, and the temperature signal may be detected separately.

Figure 3B:
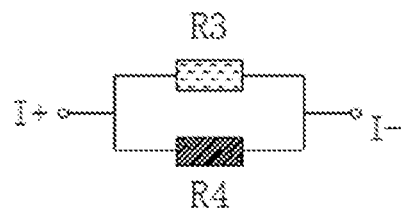

Referring to FIG. 1 and FIG. 3B, a second implementation of the temperature detection circuit is that: one surface of the temperature sensing area 12 is provided with a first sensing resistor $R_3$ and a second sensing resistor $R_4$, and the temperature detection circuit is a shunt circuit constituted by connecting the first sensing resistor $R_3$ and the second sensing resistor $R_4$ located in the temperature sensing area 12 in parallel.

The constant current source is applied, an input current I is applied to a current terminal I+ and a current terminal I−, and an output current $I_3$ on a branch circuit $R_3$ is measured, and an input and output current formula is expressed as:

$$I_3 = \frac{R_4}{R_3 + R_4} I$$

When the temperature is changed, since the first sensing resistor $R_3$ and the second sensing resistor $R_4$ have different temperature coefficients of resistance, different resistance changes are generated, a change of an electrical signal 13 is resulted, so that the temperature information is output. When the substrate 10 is stressed and is deformed, since the first sensing resistor $R_3$ and the second sensing resistor $R_4$ are arranged adjacent to each other on the same surface of the substrate 10, have the consistent deformation, and have the consistent gage factors, so that the output electrical signal is invariable. Due to this circuit configuration, the temperature detection circuit may not be affected by a stress deformation of the substrate 10, and the temperature signal may be detected separately.

Figure 3C:
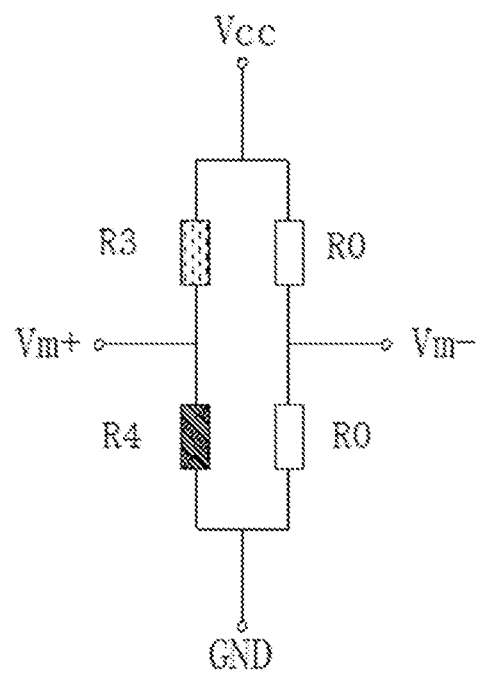

Referring to FIG. 1 and FIG. 3C, a third implementation of the temperature detection circuit is that: one surface of the temperature sensing area 12 is provided with a first sensing resistor $R_3$ and a second sensing resistor $R_4$, the temperature detection circuit is a bridge circuit constituted by electrically connecting two reference resistors $R_0$, the first sensing resistor $R_3$ and the second sensing resistor $R_4$ located in the temperature sensing area 12. The first sensing resistor $R_3$ and the second sensing resistor $R_4$ are connected in series on the same branch circuit. After the ambient temperature is changed or bending deformation is generated, the change of the resistance value of the reference resistor $R_0$ is extremely low, and thus can be ignored. The position of arrangement of the reference resistor $R_0$ is not limited. For example, the corresponding reference resistor, the first sensing resistor $R_3$ and the second sensing resistor $R_4$ are arranged to be within the same temperature sensing area 12.

In a bridge circuit constituted of two reference resistors $R_0$, the first sensing resistor $R_3$ and the second sensing resistor $R_4$, a voltage $U_i$ is input, and an output voltage $U_o$ between a terminal Vm+ and a terminal Vm− is obtained. An input and output voltage formula is expressed as:

$$U_o = \frac{R_4 R_0 - R_3 R_0}{(R_3 + R_4)(R_0 + R_0)} U_i = \frac{R_4 - R_3}{2*(R_3 + R_4)} U_i$$

When the temperature is changed, due to the fact that the first sensing resistor $R_3$ and the second sensing resistor $R_4$ have different temperature coefficients of resistance, different resistance changes may be generated, so that a change of the electrical signal $U_o$ is caused, and the temperature information is output. When the substrate 10 is stressed and deformed, since the first sensing resistor $R_3$ and the second sensing resistor $R_4$ are arranged adjacent to each other on the same surface of the substrate 10, have the consistent deformation, and have the consistent gage factors, so that the output electrical signal is invariable. Due to this circuit configuration, the temperature detection circuit may not be affected by the stress deformation of the substrate 10, and the temperature signal may be detected separately.

Figure 4:
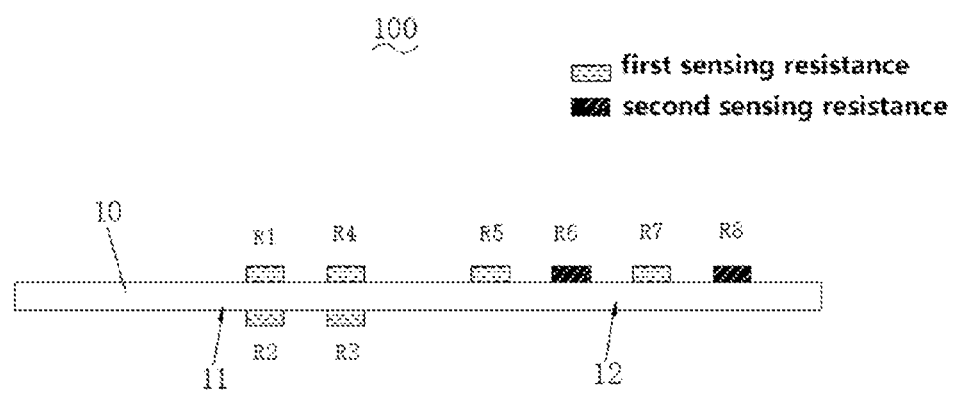
FIG. 4 illustrates a schematic structural diagram of a temperature and pressure sensor according to another embodiment of the present application.
Figure 6:
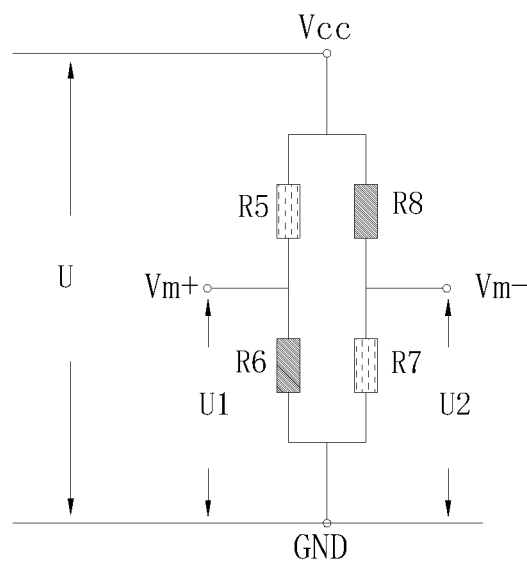
FIG. 6 illustrates a schematic diagram of the temperature detection unit in the temperature and pressure sensor according to the embodiments of the present application.

Referring to FIG. 4 and FIG. 6, a fourth implementation of the temperature detection circuit is that: one surface of the temperature sensing area 12 is provided with two first sensing resistors ($R_5$, $R_7$) and two second sensing resistors ($R_6$, $R_8$), the temperature detection circuit is a bridge circuit constituted by electrically connecting the two first sensing resistors ($R_5$, $R_7$) and the two second sensing resistors ($R_6$, $R_8$) located in the temperature sensing area 12. The two first sensing resistors ($R_5$, $R_7$) are served as one pair of opposite bridge arms of the bridge circuit, and the two second sensing resistors ($R_6$, $R_8$) are served as another pair of opposite bridge arms of the bridge circuit.

In a bridge circuit constituted of the two first sensing resistors ($R_5$, $R_7$) and the two second sensing resistors ($R_6$, $R_8$), a voltage $U_i$ is input, an output voltage $U_o$ between the terminal Vm+ and the terminal Vm− is obtained, and an input and output voltage formula is expressed as:

$$U_o = \frac{R_6 R_8 - R_5 R_7}{(R_5 + R_6)(R_7 + R_8)} U_i$$

When the temperature is changed, since the first sensing resistors $R_5$ and $R_7$ and the second sensing resistors $R_6$ and $R_8$ have different temperature coefficients of resistance, different resistance changes may be generated, so that a change of the electrical signal change $U_o$ is caused, and the temperature information is output. When the substrate 10 is stressed and deformed, since the first sensing resistors $R_5$ and $R_7$ and the second sensing resistors $R_6$ and $R_8$ are arranged on the same surface of the substrate 10 and are adjacent to each other, have the consistent deformation, and have the consistent gage factors, so that the output electrical signal is invariable. Due to this circuit configuration, the temperature detection circuit may not be affected by the stress deformation of the substrate 10, and the temperature signal may be detected separately.

Figure 7:
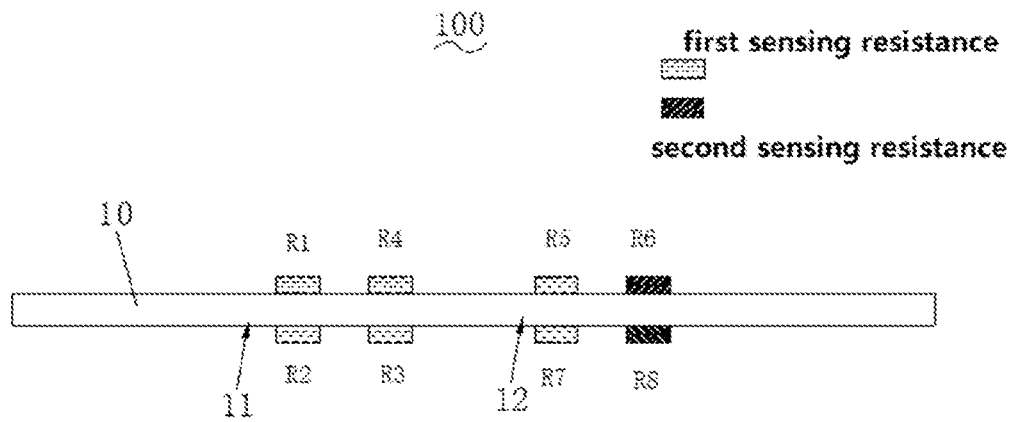
FIG. 7 illustrates schematic structural diagram of the temperature and pressure sensor according to another embodiment of the present application.

Referring to FIG. 6 and FIG. 7, a fifth implementation of the temperature detection circuit is that: one surface of the temperature sensing area 12 is provided with one first sensing resistor $R_5$ and one second sensing resistance $R_6$, the other surface of the temperature sensing area 12 is provided with one first sensing resistor $R_7$ and one second sensing resistor $R_8$. The two first sensing resistors $R_5$ and $R_7$ are oppositely arranged, the two second sensing resistors ($R_6$, $R_8$) are oppositely arranged. The temperature detection circuit is a bridge circuit constituted by electrically connecting the two first sensing resistors $R_5$ and $R_7$ and the two second sensing resistors $R_6$ and $R_8$ located in the temperature sensing area 12. The two first sensing resistors $R_5$ and $R_7$ are served as one pair of opposite bridge arms of the bridge circuit, and the two second sensing resistors $R_6$ and $R_8$ are served as the other pair of opposite bridge arms of the bridge circuit.

In a bridge circuit consisting of the two first sensing resistors $R_5$ and $R_7$ and the two second sensing resistors $R_6$ and $R_8$, a voltage $U_i$ is input, an output voltage $U_o$ between the terminal Vm+ and the terminal Vm− is obtained, and an expression of input and output voltage formula is listed below:

$$U_o = \frac{R_6 R_8 - R_5 R_7}{(R_5 + R_6)(R_7 + R_8)} U_i$$

When the temperature is changed, since the first sensing resistors $R_5$ and $R_7$ and the second sensing resistors $R_6$ and $R_8$ have different temperature coefficients of resistance, different resistance changes may be generated, so that a change of the electrical signal change $U_o$ is caused, and the temperature information is output. When the substrate 10 is stressed and deformed, since the first sensing resistors $R_5$ and $R_7$ are arranged adjacent to each other on the two surfaces of the substrate 10, the second sensing resistors $R_6$ and $R_8$ are arranged adjacent to each other on different surfaces of the substrate 10, the resistors arranged on the same surface have the consistent deformation, the deformations of the resistors on different surfaces are different, the gage factors of the various resistors are consistent, so that the output electrical signal is invariable. Due to this circuit configuration, the temperature detection circuit may not be affected by the stress deformation of the substrate 10, and the temperature signal may be detected separately.

Figure 3D:
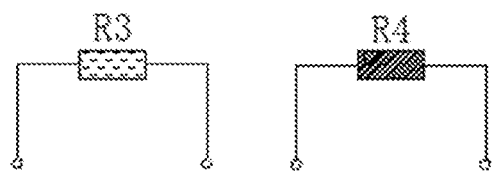

Referring to FIG. 1 and FIG. 3D, a sixth implementation of the temperature detection circuit is that: one surface of the temperature sensing area is provided with a first sensing resistor $R_3$ and a second sensing resistor $R_4$, and the temperature detection circuit includes a first resistance measuring circuit configured to measure a resistance value of the first sensing resistor $R_3$ and a second resistance measuring circuit configured to measure a resistance value of the second sensing resistor $R_4$.

When the temperature is changed, since the first sensing resistor $R_3$ and the second sensing resistor $R_4$ have different temperature coefficients of resistance, different resistance changes may be generated, resistance changes of the first sensing resistor $R_3$ and the second sensing resistor $R_4$ are obtained through the first resistance measurement circuit and the second resistance measurement circuit, and the temperature information may be obtained by comparing the resistance change values of the first sensing resistor $R_3$ with the resistance change values of the second sensing resistor $R_4$. When the substrate 10 is stressed and deformed, since the first sensing resistor $R_3$ and the second sensing resistor $R_4$ are arranged adjacent to each other on the same surface of the substrate 10, have the consistent deformation, and have the consistent gage factors, so that the resistance change value of the first sensing resistor $R_3$ is equal to the resistance change value of the second sensing resistor $R_4$. Due to this circuit configuration, the temperature detection circuit may not be affected by the stress deformation of the substrate 10, and the temperature signal may be detected separately.

The first resistance measurement circuit and the second resistance measurement circuit have various implementations, such as Ohmmeter-based resistance measurement, voltammetry-based resistance measurement, RC-circuit-based resistance measurement, RC-oscillator-circuit-based resistance measurement, RLC-parallel-resonance-circuit-based resistance measurement, etc., which are selected as required. The Ohmmeter resistance measurement and the voltammetry resistance measurement are the manners for direct resistance measurement, and the corresponding resistance measurement circuits are conventional techniques.

Figure 3E:
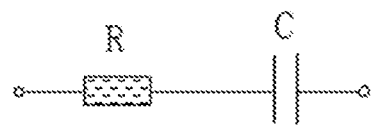
Figure 3F:
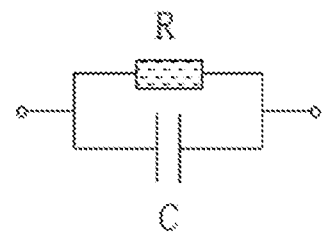

The RC circuit may be an RC series circuit as shown in FIG. 3E, or be an RC parallel circuit as shown in FIG. 3F. By charging and discharging the RC circuit, a time constant $\tau$ of the RC circuit may be measured. The time constant of the RC circuit is expressed as:

$$\tau = RC$$

According to the aforesaid formula, a capacitance C of the capacitor is known, the resistance value of the resistor R can be inversely calculated through the measured time constant $\tau$. Here, the resistor R in the RC circuit is the first sensing resistor $R_3$ or the second sensing resistor $R_4$.

Figure 3G:
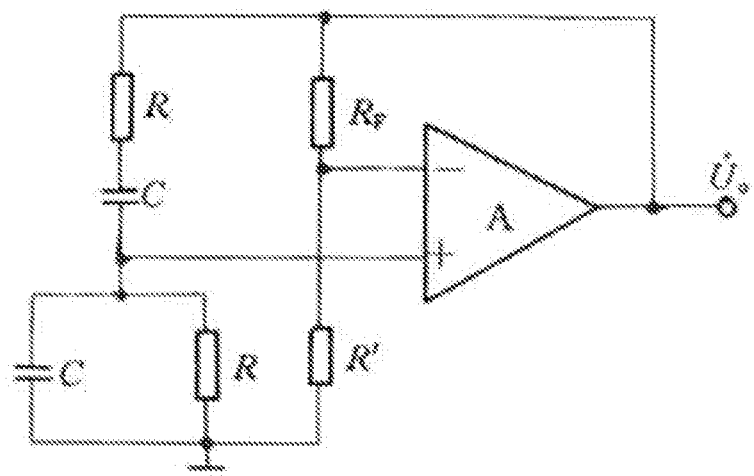

As shown in FIG. 3G, the RC oscillator circuit combines an RC series-parallel frequency selection network and an amplifier, the amplifier may adopt an integrated operational amplifier. The RC series-parallel frequency selection network is connected between an output and an in-phase input of the operational amplifier to form a positive feedback, and RF and R' are connected between the output and the inverting input of the operational amplifier to form a negative feedback. The positive feedback circuit and the negative feedback circuit form a Wien bridge oscillator circuit, and an input and an output of the operational amplifier are respectively bridged on two diagonal lines of the bridge. An output frequency of the Wien bridge oscillator circuit is expressed as:

$$f_0 = \frac{1}{2\pi RC}$$

The frequency $F_0$ is very sensitive to the change of the resistance value R. According to the aforesaid formula, when the capacitance C of the capacitor is known, the resistance value R can be inversely calculated through the measured frequency $f_0$. Here, the resistor R in the RC series-parallel frequency selection network is the first sensing resistor $R_3$ or the second sensing resistor $R_4$.

Figure 3H:
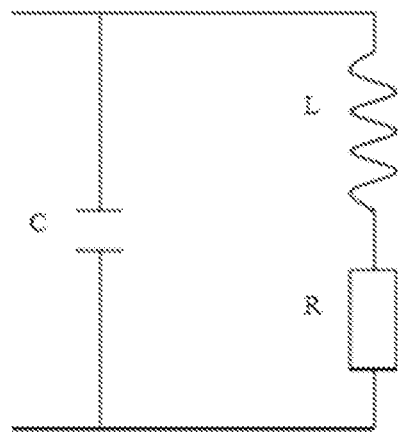

As shown in FIG. 3H, a RLC parallel resonant circuit is a circuit that connects the RL series circuit and the capacitor C in parallel. An angular frequency of the RLC parallel resonant circuit is expressed as:

$$\omega = \sqrt{\frac{1}{LC} - \left(\frac{R}{L}\right)^2}$$

According to the aforesaid formula, when an inductance value L of the inductor and a capacitance C of the capacitor are known, the resistance value R can be inversely calculated through the measured angular frequency $\omega$. Here, the resistor R in the RLC parallel resonance circuit is the first sensing resistor $R_3$ or the second sensing resistor $R_4$.

Figure 2A:
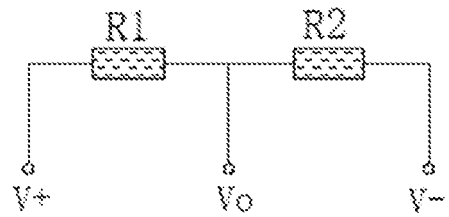
FIG. 2A-2D illustrate a schematic diagram of multiple implementations of a pressure detection circuit of the temperature and pressure sensor shown in FIG. 1.

There are various optional implementations for the arrangement of the pressure detection circuit. Referring to FIG. 1 and FIG. 2A, a first implementation of the pressure detection circuit is that: two opposite surfaces of the pressure sensing area 11 are respectively provided with one first sensing resistors $R_1$ and $R_2$, the two first sensing resistors $R_1$ and $R_2$ are oppositely arranged, and the pressure detection circuit is a voltage dividing circuit constituted by connecting the two first sensing resistors $R_1$ and $R_2$ located in the pressure sensing area 11 in series.

A constant voltage source is applied, an input voltage $U_i$ is applied to a terminal V+ and a terminal V−, the potential at a terminal $V_o$ is measured, or an output voltage $U_o$ between the terminal $V_o$ and the ground is measured, and an input and output voltage formula is expressed as:

$$U_o = \frac{R_2}{R_1 + R_2} U_i$$

Figure 8:
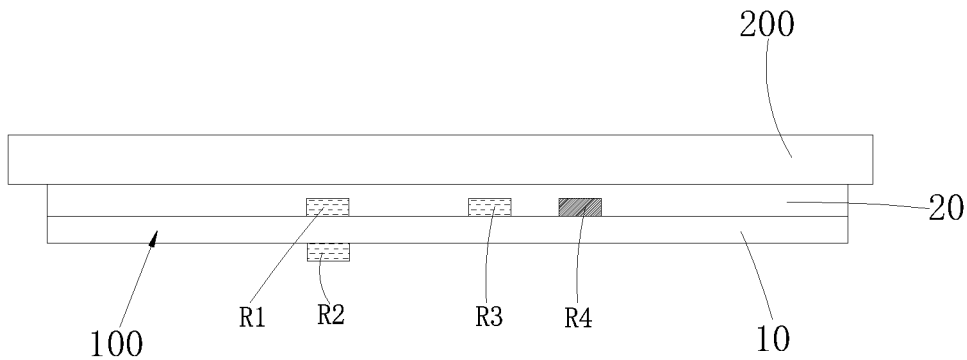
FIG. 8 illustrates a schematic structural diagram of an electronic device according to one embodiment of the present application.
Figure 9:
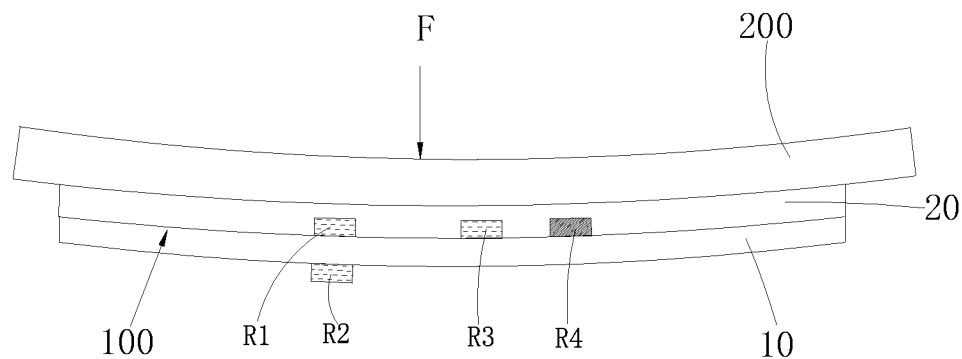
FIG. 9 illustrates a schematic structural diagram of the electronic device in FIG. 8 when an object to be detected is stressed and is deformed.

When the temperature is changed, since the first sensing resistors $R_1$ and $R_2$ have the same temperature coefficient of resistance, the output electrical signal is invariable. With reference to FIG. 8 and FIG. 9, when the substrate 10 is stressed and deformed, since the first sensing resistors $R_1$ and $R_2$ are arranged on the two sides of the substrate 10, different deformation may be generated, a lower surface of the substrate 10 is subjected to a tensile strain, an upper surface of the substrate 10 is subjected to a compressive strain, so that the corresponding first sensing resistors $R_1$ and $R_2$ generates different resistance changes, so that a change of the electrical signal $U_o$ is caused, and pressure information is output. Due to this circuit configuration, the pressure detection circuit may detect the pressure signal independently without being affected by ambient temperature.

Figure 2B:
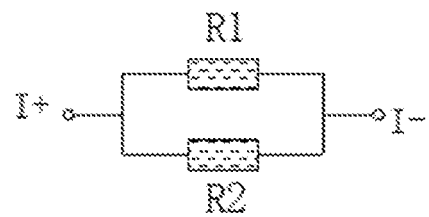

Referring to FIG. 1 and FIG. 2B a second implementation of the pressure detection circuit is that: two opposite surfaces of the pressure sensing area 11 are respectively provided with first sensing resistors $R_1$ and $R_2$, the two first sensing resistors $R_1$ and $R_2$ are oppositely arranged, and the pressure detection circuit is a shunt circuit constituted by connecting the two first sensing resistors $R_1$ and $R_2$ located in the pressure sensing area 11 in parallel.

The constant current source is used to input a current I at a current terminal I+ and a current terminal I−, and an output current I1 on a branch circuit $R_1$ is measured. An input and output current formula is expressed as:

$$I_1 = \frac{R_2}{R_1 + R_2} I$$

When the temperature is changed, since the first sensing resistors $R_1$ and $R_2$ have the same temperature coefficient of resistance, so that the output electrical signal is invariable. With reference to FIG. 8 and FIG. 9, when the substrate 10 is stressed and deformed, since the first sensing resistors $R_1$ and $R_2$ are arranged on the two sides of the substrate 10, different deformations may be generated. The lower surface of the substrate 10 is subjected to a tensile strain, the upper surface of the substrate 10 is subjected to a compressive strain, and the corresponding first sensing resistors $R_1$ and $R_2$ generate different resistance changes, so that the change of the electrical signal I1 is caused, and the pressure information is output. Due to this circuit configuration, the pressure detection circuit may detect the pressure signal independently without being affected by the ambient temperature.

Figure 2C:
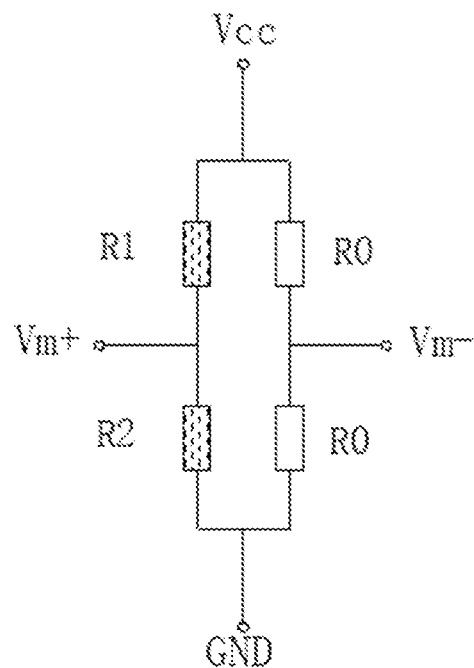

Referring to FIG. 1 and FIG. 2C, a third implementation of the pressure detection circuit is that: two opposite surfaces of the pressure sensing area 11 are respectively provided with the first sensing resistors $R_1$ and $R_2$, the two first sensing resistors $R_1$ and $R_2$ are oppositely arranged, and the pressure detection circuit is a bridge circuit constituted by electrically connecting two reference resistors $R_0$ and the two first sensing resistors located in the pressure sensing area 11. After the ambient temperature is changed or bending deformation of the substrate 10 is generated, the change of the resistance value of the reference resistor $R_0$
is extremely low, which can be ignored. The position of the arrangement of the reference resistor $R_0$ is not limited. For example, the reference resistor $R_0$ and the corresponding first sensing resistors $R_1$, $R_2$ are arranged in the same pressure sensing area 11.

In the bridge circuit constituted of two reference resistors $R_0$ and the two first sensing resistors ($R_1$, $R_2$), a voltage $U_i$ is input, an output voltage $U_o$ between a terminal Vm+ and a terminal Vm− is obtained. An input and output voltage formula is expressed as:

$$U_o = \frac{R_2 R_0 - R_1 R_0}{(R_1 + R_2)(R_0 + R_0)} U_i = \frac{R_2 - R_1}{2*(R_1 + R_2)} U_i$$

When the temperature is changed, since the first sensing resistors $R_1$ and $R_2$ have the same temperature coefficient of resistance, the output electrical signal is invariable. With reference to FIG. 8 and FIG. 9, when the substrate 10 is stressed and deformed, since the first sensing resistors $R_1$ and $R_2$ are arranged on two sides of the substrate 10, different deformation may be generated, the lower surface of the substrate 10 is subjected to a tensile strain, the upper surface of the substrate 10 is subjected to a compressive strain, and the corresponding first sensing resistors $R_1$ and $R_2$ generate different resistance changes, so that the change of the electrical signal $U_o$ is caused, and the pressure information is output. Due to this circuit configuration, the pressure detection circuit may detect the pressure signal independently without being affected by the ambient temperature.

Figure 5:
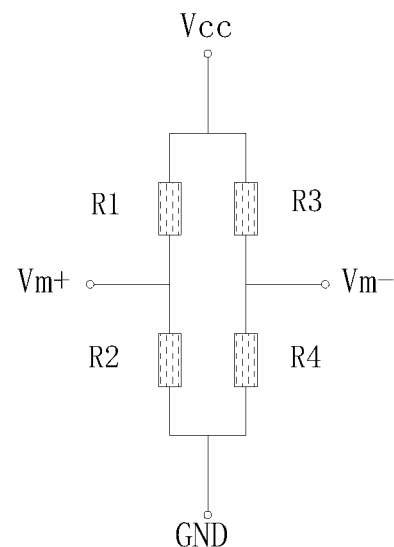
FIG. 5 illustrates a schematic diagram of the pressure detection circuit in the temperature and pressure sensor according to the embodiments of the present application.

Referring to FIG. 4 and FIG. 5, a fourth implementation of the pressure detection circuit is that, two opposite surfaces of the pressure sensing area 11 are provided with two first sensing resistors, respectively. The first sensing resistance $R_1$ and the first sensing resistance $R_4$ are arranged at the same surface, the first sensing resistance $R_2$ and the first sensing resistance $R_3$ are arranged at the same surface, every two first sensing resistors are oppositely arranged, the first sensing resistance $R_1$ is opposite to the first sensing resistance $R_2$, the first sensing resistance $R_4$ is opposite to the first sensing resistance $R_3$. The pressure detection circuit is a bridge circuit constituted by electrically connecting the four first sensing resistors $R_1$, $R_2$, $R_3$ and $R_4$ located in the pressure sensing area 11, two first sensing resistors located on the same surface of the pressure sensing area 11 are served as one pair of opposite bridge arms of the bridge circuit. The first sensing resistors $R_1$ and $R_4$ are served as one pair of opposite bridge arms, and the first sensing resistors $R_2$ and $R_3$ are served as the other pair of opposite bridge arms.

In a bridge circuit composed of the first sensing resistors $R_1$, $R_2$, $R_3$, and $R_4$, a voltage $U_i$ is input, and an output voltage $U_o$ between the terminal Vm+ and the terminal Vm− is obtained. An input and output voltage formula is expressed as:

$$U_o = \frac{R_2 R_3 - R_1 R_4}{(R_1 + R_2)(R_3 + R_4)} U_i$$

Figure 10:
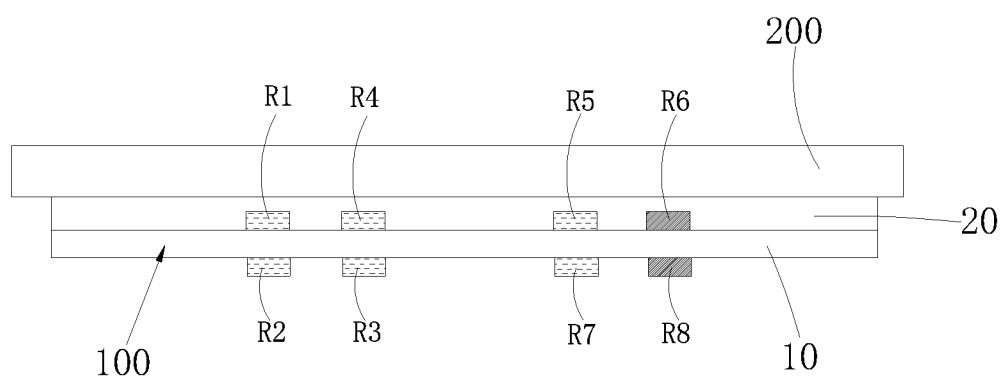
FIG. 10 illustrates a schematic structural diagram of the electronic device according to another embodiment of the present application.
Figure 11:
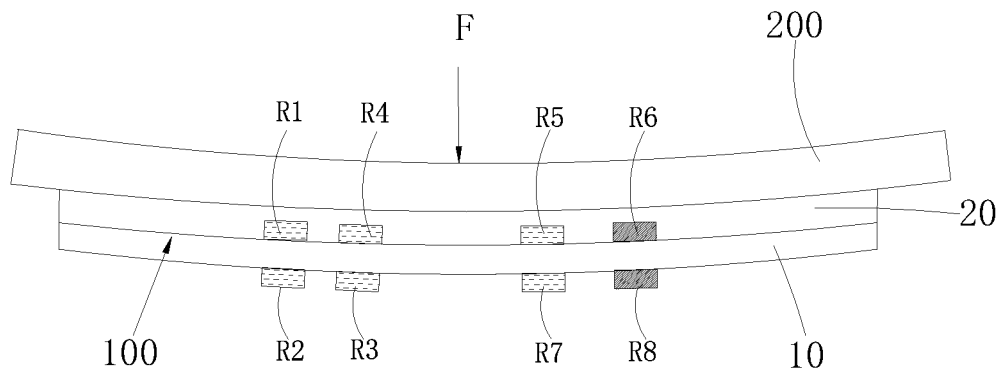
FIG. 11 illustrates a schematic structural diagram of the electronic device shown in FIG. 10, when the object to be detected is subjected to the applied force and is deformed.

When the temperature is changed, since the first sensing resistors $R_1$, $R_2$, $R_3$, and $R_4$ have the same temperature coefficient of resistance, so that the output electrical signal is invariable. As shown in FIG. 10 and FIG. 11, when the substrate 10 is stressed and deformed, since the first sensing resistors $R_1$ and $R_4$ are arranged on the same surface of the substrate 10, the first sensing resistors $R_2$ and $R_3$ are disposed on the other surface of the substrate 10, so that the two surfaces generate different deformations, the lower surface of the substrate 10 is subjected to a tensile strain, the upper surface of the substrate 10 is subjected to a compressive strain, and the corresponding first sensing resistors generate different resistance changes, a change of the electrical signal $U_o$ is caused, so that the pressure information is output. Due to this circuit configuration, the pressure detection circuit may detect the pressure signal independently without being affected by the ambient temperature.

Figure 2D:
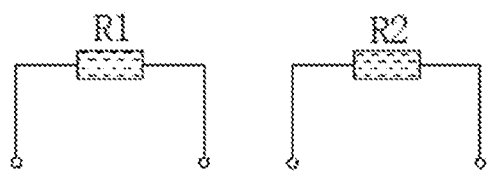

Referring to FIG. 1 and FIG. 2D, a fifth implementation of the pressure detection circuit is that: two opposite surfaces of the pressure sensing area are respectively provided with one first sensing resistor $R_1$ and $R_2$, the two first sensing resistors $R_1$ and $R_2$ are oppositely arranged. The pressure detection circuit includes a third resistance measuring circuit for measuring a resistance value of the first sensing resistors $R_1$ and a fourth resistance measuring circuit for measuring a resistance value of the first sensing resistor $R_2$.

When the temperature is changed, since the first sensing resistors $R_1$ and $R_2$ have the same temperature coefficient of resistance, so that the changes of the resistance values of the two resistors are identical. With reference to FIG. 8 and FIG. 9, when the substrate 10 is stressed and deformed, since the two first sensing resistors $R_1$ and $R_2$ are arranged on two sides of the substrate 10 respectively, different deformations may be generated, the lower surface of the substrate 10 is subjected to a tensile strain, the upper surface of the substrate 10 is subjected to a compressive strain, the two first sensing resistors $R_1$ and $R_2$ generate different resistance changes, different resistance change values are obtained through the third resistance measurement circuit and the fourth resistance measurement circuit respectively, and pressure information is obtained by comparing the changes of the resistance values of the two first sensing resistors $R_1$ and $R_2$. Due to this circuit configuration, the pressure detection circuit may detect the pressure signal independently without being affected by the ambient temperature.

There are various implementations of the third resistance measurement circuit and the fourth resistance measurement circuit, such as Ohmmeter-based resistance measurement, voltammetry-based resistance measurement, RC-circuit-based resistor measurement, RC-oscillator-circuit-based resistor measurement, RLC-parallel-resonance-circuit-based resistor measurement, etc., which are selected as required. Regarding the specific implementation of the third resistance measurement circuit and the fourth resistance measurement circuit, reference can be made to the related descriptions of the first resistance measurement circuit and the second resistance measurement circuit described above.

It can be understood that, one of the multiple implementations of the aforesaid temperature detection circuit and the aforesaid pressure detection circuit are selected and recombined, thereby realizing multiple optional implementations for detecting temperature and pressure separately.

In another embodiment of this application, one of the pressure sensing areas 11 is arranged to be adjacent to one of the temperature sensing areas 12. Referring to FIG. 8 and FIG. 9, during use, the substrate 10 is abutted against the object 200 to be detected 200, so that the substrate 10 can be deformed with the deformation of the object to be detected 200. The pressure detection circuit may detect the condition of stress deformation of the substrate 10, and the temperature detection circuit may detect the condition of temperature change of the substrate 10. Thus, a near-distance temperature and pressure detection are realized, and it is convenient to use the temperature and pressure sensor.

In another embodiment of the present application, at least a part of one of the pressure sensing areas is overlapped with at least a part of one of the temperature sensing areas. A part of the pressure sensing area is overlapped with a part of the temperature sensing area. As an alternative, the pressure sensing area and the temperature sensing area are completely overlapped. All of the aforesaid solutions can achieve near-distance temperature and pressure detection.

In another embodiment of the present application, the number of the pressure sensing areas 11 and the number of temperature sensing areas 12 are plural, one pressure sensing area 11 and one temperature sensing area 12 are constituted as one sensing area. The substrate 10 is provided with a plurality of sensing areas. By adopting this arrangement, the substrate 10 may form the plurality of sensing areas, the pressure information and the temperature information at different locations are detected by the pressure detection circuit and the temperature detection circuit in different sensing areas, respectively, so that the range of the detection region is expanded.

In another embodiment of the present application, any one of the first sensing resistors and any one of the second sensing resistors are the one selected from a group consisting of a metal film resistor, a strain gauge resistor, a semiconductor resistor, a ceramic resistor, and a conductive polymer resistor. The types of the various first sensing resistors and the types of the various second sensing resistors are the same or different. The aforesaid technical solution can achieve the near-distance temperature and pressure detection. In addition, the first sensing resistors and the second sensing resistors may also be other types of sensing resistors.

In addition, the first sensing resistors and the second sensing resistors may be prepared by printing, fitting, spin-coating, sputtering, etc. The preparation methods of the first sensing resistors and the second sensing resistors may be the same or different, and are selected as required.

Referring to FIG. 7, a temperature and pressure sensor 100 is provided in one embodiment of the present application, the temperature and pressure sensor 100 includes a substrate 10, first sensing resistors and second sensing resistors. The first sensing resistors and the second sensing resistors have different gage factors and different temperature coefficients of resistance. The substrate 10 has a pressure sensing area 11 and a temperature sensing area 12.

Two opposite surfaces of the pressure sensing area 11 are respectively provided with one first sensing resistor, and the first sensing resistors located in the pressure sensing area 11 are constituted as a pressure detection circuit.

At least one surface of the temperature sensing area 12 is provided with one first sensing resistor and one second sensing resistor which are adjacent to each other; the first sensing resistor and the second sensing resistor located in the temperature sensing area 12 are constituted as a temperature detection circuit. The first sensing resistor and the second sensing resistor may be one single resistor, or be equal to one single resistor constituted by electrically connecting a plurality of resistors.

In the temperature and pressure sensor 100 provided by the present application, as compared to the related art, in the temperature and pressure sensor 100, the substrate 10 has the pressure sensing area 11 and the temperature sensing area 12, two opposite surfaces of the pressure sensing area 11 are respectively provided with one first sensing resistor, and these first sensing resistors are constituted as the pressure detection circuit. When the temperature is changed, since the first sensing resistors within the pressure sensing area 11 has the same temperature coefficient of resistance, so that the output electrical signal is invariable. When the substrate 10 is stressed and a bending deformation of the substrate 10 is generated, the two first sensing resistors on the two surfaces of the pressure sensing area 11 will generate different deformations, different resistance changes are generated, so that a change of electrical signal is caused, and the pressure information is output.

At least one surface of the temperature sensing area 12 is provided with one first sensing resistor and one second sensing resistor, the first sensing resistor and the second sensing resistor are constituted as the temperature detection circuit. When the ambient temperature is changed, since the temperature coefficients of resistance of the first sensing resistor and the second sensing resistor are different, different resistance changes may be generated, so that the change of the electrical signal is caused, the temperature information is output. When the substrate 10 is stressed and deformed, since the first sensing resistor and the second sensing resistor on the same surface of the temperature sensing area 12 are arranged adjacent to each other, the first sensing resistor and the second sensing resistor have the consistent deformation, so that the output electrical signal is substantially invariable. The pressure detection circuit and the temperature detection circuit in the temperature and pressure sensor 100 may detect pressure and temperature, separately and independently, and the temperature and pressure sensor 100 has a compact structure and is small in size, and thus is convenient to be used.

When the temperature detection circuit is arranged, referring to FIG. 6 and FIG. 7, one surface of the temperature sensing area 12 is provided with one first sensing resistor $R_5$ and one second sensing resistor $R_6$, and the other surface of the temperature sensing area 12 is provided with one first sensing resistor $R_7$ and one second sensing resistor $R_8$. The two first sensing resistors $R_5$, $R_7$ are oppositely arranged, the two second sensing resistors $R_6$, $R_8$ are oppositely arranged. The temperature detection circuit is a bridge circuit constituted by electrically connecting the two first sensing resistors $R_5$, $R_7$ and the two second sensing resistors $R_6$, $R_8$. The two first sensing resistors $R_5$, $R_7$ are served as one pair of opposite bridge arms of the bridge circuit, the two second sensing resistors $R_6$, $R_8$ are served as the other pair of opposite bridge arms of the bridge circuit.

In a bridge circuit consisting of two first sensing resistors $R_5$ and $R_7$ and two second sensing resistors $R_6$ and $R_8$, a voltage $U_i$ is input, an output voltage $U_o$ between the terminal Vm+ and the terminal Vm− is obtained, and an input and output voltage formula is expressed as:

$$U_o = \frac{R_6 R_8 - R_5 R_7}{(R_5 + R_6)(R_7 + R_8)} U_i$$

The temperature coefficients of resistance of the first sensing resistors $R_5$ and $R_7$ are represented as $K_1$, the temperature coefficients of resistance of the second sensing resistors $R_6$ and $R_8$ are represented as K2.

Based on the expression of the temperature coefficient of resistance, formulas are expressed as:

$$R_5 = [K_1(T-T_0)+1]R_{50}$$

$$R_6 = [K_2(T-T_0)+1]R_{60}$$

$$R_7 = [K_1(T-T_0)+1]R_{70}$$

$$R_8 = [K_2(T-T_0)+1]R_{80}$$

To represents an initial temperature value; T represents a temperature value at a predetermined moment; $R_{50}$, $R_{60}$, $R_{70}$, and $R_{80}$ represents initial resistance values of different sensing resistors, respectively; $R_5$, $R_6$, $R_7$, and $R_8$ are resistance values of different sensing resistors at the predetermined moment, respectively.

In combination with the input and output voltage formula listed above, a formula is expressed as:

$$U_o = \left( \frac{R_6}{(R_5 + R_6)} - \frac{R_7}{(R_7 + R_8)} \right) U_i$$

$$= \left[ \frac{1}{\frac{K_1(T-T_0)+1}{K_2(T-T_0)+1} \cdot \frac{R_{50}}{R_{60}} + 1} - \frac{1}{\frac{K_2(T-T_0)+1}{K_1(T-T_0)+1} \cdot \frac{R_{80}}{R_{70}} + 1} \right] U_i$$

This is a mathematical relationship between $U_0$, T and TCR.

When the temperature is changed, since the first sensing resistors $R_5$ and $R_7$ and the second sensing resistor $R_6$ and $R_8$ have different temperature coefficients of resistance, different resistance changes may be generated, so that the change of the electrical signal $U_o$ is caused, the temperature information is output. With reference to FIG. 10 and FIG. 11, when the substrate 10 is stressed and deformed, the two first sensing resistors $R_5$ and $R_7$ are respectively arranged on different surfaces of the substrate 10, the two second sensing resistors $R_6$ and $R_8$ are respectively arranged on different surfaces of the substrate 10, the lower surface of the substrate 10 is subjected to a tensile strain, the upper surface of the substrate 10 is subjected to a compressive strain, so that the resistors generate deformations accordingly. Although the gage factors of the first sensing resistor $R_5$ and $R_7$ and the second sensing resistor $R_6$ and $R_8$ are different, the output electrical signal is invariable when quadratic term is discarded. The following descriptions prove that the output electric signal of the bridge circuit composed of the sensing resistors $R_5$, $R_6$, $R_7$ and $R_8$ is invariable when a pressure F is changed. That is, the bridge circuit may detect the temperature signal independently without being affected by the stress deformation of the substrate 10.

Assuming that the gage factor of the first sensing resistor $R_5$, $R_7$ is A, the gage factor of the second sensing resistor $R_6$ and $R_8$ is B, the resistance value of each of the sensing resistors $R_5$, $R_6$, $R_7$ and $R_8$ is R. When the substrate 10 is stressed and deformed, the strain of the sensing resistors $R_5$ and $R_6$ is E, the strain of the sensing resistors $R_7$, and $R_8$ is −e.

Before the substrate 10 is stressed and deformed, U1=U2=U/2, it only needs to prove that U1=U2 when the pressure F is applied, in order to prove that the signal output is invariable.

$$U1 = U * R_6/(R_5 + R_6)$$

$$= U^*\{R(1 + eb)\}/\{R(2 + eb + ea)\}$$

$$= U(1 + eb)/(2 + eb + ea)$$

$$= U(2 - ea - eb + 2eb - eeab - eebb)/\{(2 + eb + ea)(2 - ea - eb)\}$$

$$= U(2 + eb - ea - e^2 b(a+b))/\{(2 + eb + ea)(2 - ea - eb)\}$$

$$U2 = U^* R_7/(R_7 + R_8)$$

$$= U^*\{R(1 - ea)\}/\{R(2 - ea - eb)\}$$

$$= U(1 - ea)/(2 - ea - eb)$$

$$= U(2 + eb + ea - 2ea - eeab - eeaa)/\{(2 + eb + ea)(2 - ea - eb)\}$$

$$= U(2 + eb - ea - e^2 a(a+b))/\{(2 + eb + ea)(2 - ea - eb)\}$$

Since $e^2$ is the quadratic term in the formula, e is a very small value, and can be ignored. Thus, U1=U2.

Due to this circuit configuration, the temperature detection circuit may detect the temperature signal independently without being affected by the stress deformation of the substrate 10.

There are various optional implementations for the arrangement of the pressure detection circuit, regarding the implementations of the arrangement of the pressure detection circuit, reference can be made to the multiple implementations of the pressure detection circuit, which are selected as required.

Referring to FIG. 8 to FIG. 11, in another embodiment of the present application, an electronic device is provided. The electronic device includes an object to be detected 200 and the aforesaid temperature and pressure sensor 100. The substrate 10 is arranged to abut against a surface of the object to be detected 200. In the electronic device, the substrate 10 in the temperature and pressure sensor 100 abuts against the object to be detected 200, so that the substrate 10 can be deformed with the deformation of the object to be detected 200, pressure and temperature are separately and independently detected by the pressure detection circuit and the temperature detection circuit in the temperature and pressure sensor 100, respectively. The electronic device has a compact structure and is small in size. Thus, it is convenient to use the electronic device.

In one embodiment, the object to be detected 200 may be a panel, such as a touch screen, a display, or other electronic devices having a rigid structure. By connecting the substrate 10 with the object to be detected 200, such that the value of the touch pressure and the ambient temperature can be accurately recognized while the touch position can be accurately recognized, the application space of the electronic device in product application, man-machine interaction and consumption experience is expanded. A user can directly obtain an accurate pressure level and pressure magnitude by touching a touch screen, a display, or an electronic device. Specifically, the panel may be a glass plate having a thickness of 1.1 mm, and the designed glass panel is provided with a touch screen function. As an alternative, the panel may be a liquid crystal display (Liquid Crystal Display, LCD) or an organic light emitting diode (Organic Light Emitting Diode, OLED) display screen having a thickness of 1.6 mm. As yet another alternative, the panel may be an electronic component having a tactile function and a display function.

The substrate 10 may be attached to the surface of the object 200 to be detected by pasting, welding, or other mechanical connection methods. When a colloid 20 is used for pasting, the substrate 10 can be used when it is pasted on the surface of the object 200 to be detected through the adhesive 20, it is convenient to use the colloid 20, so that an assembly process is simplified, and rework is facilitated. The colloid 20 is a water glue or a double-sided adhesive. The substrate 10 may also be fixed on the object 200 to be detected by welding, and the substrate 10 may also be deformed when the object 200 to be detected is stressed and deformed.

Only some optional embodiments of the present application are described above, and these embodiments are not intended to limit the present application. It is obvious to the person of ordinary skill in the art that, various modifications and changes may be made in the present application. Any modification, equivalent replacement, improvement, and the like, which are made within the spirit and the principle of the present application, should all be included in the protection scope of the claims of the present application.

What is claimed is:

1. A temperature and pressure sensor, comprising:
   a substrate, comprising at least one pressure sensing area and at least one temperature sensing area;
   a plurality of first sensing resistors having substantially identical first temperature coefficients of resistance; and
   a plurality of second sensing resistors having substantially identical second temperature coefficients of resistance different from the first temperature coefficients of resistance;
   wherein the plurality of first sensing resistors and the plurality of second sensing resistors have a same gage factor;
   wherein two first sensing resistors of the plurality of first sensing resistors are disposed on two respective opposite surfaces of the at least one pressure sensing area and constitute a pressure detection circuit;
   wherein one of the plurality of first sensing resistors and one of the plurality of second sensing resistors are disposed adjacent to each other on at least one surface of the at least one temperature sensing area and constitute a temperature detection circuit; and
   wherein the pressure detection circuit is configured to detect pressure, the temperature detection circuit is configured to detect temperature, and pressure detection by the pressure detection circuit is separate from and independent of temperature detection by the temperature detection circuit.

2. The temperature and pressure sensor according to claim 1, wherein one surface of the temperature sensing area is provided with one of the plurality of first sensing resistors and one of the plurality of second sensing resistors, and the temperature detection circuit is a voltage dividing circuit constituted by connecting the one of the plurality of first sensing resistors and the one of plurality of second sensing resistors in series in the temperature sensing area; or
   one surface of the temperature sensing area is provided with the one of the plurality of first sensing resistors and the one of plurality of second sensing resistors, and the temperature detection circuit is a shunt circuit constituted by connecting the one of the plurality of first sensing resistors and the one of plurality of second sensing resistors in parallel in the temperature sensing area; or
   one surface of the temperature sensing area is provided with the one of the plurality of first sensing resistors and the one of plurality of second sensing resistors, and the temperature detection circuit is a bridge circuit constituted by electrically connecting two reference resistors and the one of the plurality of first sensing resistors and the one of plurality of second sensing resistors located in the temperature sensing area; or
   one surface of the temperature sensing area is provided with two of the plurality of first sensing resistors and two of the plurality of second sensing resistors, the temperature detection circuit is a bridge circuit constituted by electrically connecting the two of the plurality of first sensing resistors and the two of the plurality of second sensing resistors in the temperature sensing area; wherein the two of the plurality of first sensing resistors are served as one pair of opposite bridge arms of the bridge circuit, and the two of the plurality of second sensing resistors are served as another pair of opposite bridge arms of the bridge circuit; or
   one surface of the temperature sensing area is provided with one of the plurality of first sensing resistors and one of the plurality of second sensing resistors, another surface of the temperature sensing area is provided with one of the plurality of first sensing resistors and one of the plurality of second sensing resistors; wherein two of the plurality of first sensing resistors are oppositely arranged, two of the plurality of second sensing resistors are oppositely arranged; the temperature detection circuit is a bridge circuit constituted by electrically connecting the two of the plurality of first sensing resistors and the two of the plurality of second sensing resistors located in the temperature sensing area; wherein the two of the plurality of first sensing resistors are served as one pair of opposite bridge arms of the bridge circuit, and the two of the plurality of second sensing resistors are served as the other pair of opposite bridge arms of the bridge circuit; or
   one surface of the temperature sensing area is provided with the one of the plurality of first sensing resistors and the one of plurality of second sensing resistors, and the temperature detection circuit comprises a first resistance measuring circuit for measuring a resistance value of the one of plurality of first sensing resistors and a second resistance measuring circuit for measuring a resistance value of the one of plurality of second sensing resistors.

3. A temperature and pressure sensor, comprising:
   a substrate comprising a plurality of pressure sensing areas and a plurality of temperature sensing areas,
   a plurality of first sensing resistors having substantially identical first temperature coefficients of resistance; and
   a plurality of second sensing resistors having substantially identical second temperature coefficients of resistance different from the first temperature coefficients of resistance,
   wherein the plurality of first sensing resistors and the plurality of second sensing resistors have different gage factors;
   wherein, for each pressure sensing area from the plurality of pressure sensing areas, two corresponding first sensing resistors from the plurality of first sensing resistors are disposed on two respective opposite surfaces of the pressure sensing area and constitute a pressure detection circuit; and wherein, for each temperature sensing area from the plurality of temperature sensing areas, one corresponding first sensing resistor of the plurality of first sensing resistors and one corresponding second sensing resistor of the plurality of second sensing resistors are disposed adjacent to each other on at least one surface of the temperature sensing area and constitute a temperature detection circuit; and wherein the pressure detection circuit is configured to detect pressure, the temperature detection circuit is configured to detect temperature, and pressure detection by the pressure detection circuit is separate from and independent of temperature detection by the temperature detection circuit.

4. The temperature and pressure sensor according to claim 3, wherein one surface of the temperature sensing area is provided with one of the plurality of first sensing resistors and one of the plurality of second sensing resistors, another surface of the temperature sensing area is provided with another one of the plurality of first sensing resistors and another one of the plurality of second sensing resistors;

wherein two first sensing resistors are oppositely arranged, two of the plurality of second sensing resistors are oppositely arranged; the temperature detection circuit is a bridge circuit constituted by electrically connecting the two first sensing resistors and the two of the plurality of second sensing resistors located in the temperature sensing area; and wherein the two first sensing resistors are served as one pair of opposite bridge arms of the bridge circuit, and the two of the plurality of second sensing resistors are served as the other pair of opposite bridge arms of the bridge circuit.

5. The temperature and pressure sensor according to claim 3, wherein two opposite surfaces of the pressure sensing area are provided with one of the plurality of first sensing resistors respectively, two of the plurality of first sensing resistors located on the two opposite surfaces of the pressure sensing area are oppositely arranged, and the pressure detection circuit is a voltage dividing circuit constituted by connecting the two of the plurality of first sensing resistors in the pressure sensing area in series; or alternatively, two opposite surfaces of the pressure sensing area are provided with one of the plurality of first sensing resistors respectively, two of the plurality of first sensing resistors located on the two opposite surfaces of the pressure sensing area are oppositely arranged, and the pressure detection circuit is a shunt circuit constituted by connecting the two of the plurality of first sensing resistors in the pressure sensing area in parallel; or alternatively, two opposite surfaces of the pressure sensing area are provided with one of the plurality of first sensing resistors respectively, two of the plurality of first sensing resistors located on the two opposite surfaces of the pressure sensing area are oppositely arranged, and the pressure detection circuit is a bridge circuit constituted by electrically connecting two reference resistors and the two of the plurality of first sensing resistors in the pressure sensing area; or alternatively, two opposite surfaces of the pressure sensing area are provided with two of the plurality of first sensing resistors respectively, the two of the plurality of first sensing resistors are oppositely arranged, the pressure detection circuit is a bridge circuit constituted by electrically connecting four first sensing resistors in the pressure sensing area, wherein every two of the plurality of first sensing resistors located on a same surface of the pressure sensing area are served as one pair of opposite bridge arms of the bridge circuit; or alternatively, the two opposite surfaces of the pressure sensing area are provided with one of the plurality of first sensing resistors respectively, two of the plurality of first sensing resistors located on the two opposite surfaces of the pressure sensing area are oppositely arranged, and the pressure detection circuit comprises a third resistance measuring circuit configured to measure a resistance value of one of the two of the plurality of first sensing resistors and a fourth resistance measuring circuit configured to measure a resistance value of the another one of the two of the plurality of first sensing resistors.

6. The temperature and pressure sensor according to claim 3, wherein one of the pressure sensing areas is arranged to be adjacent to one of the temperature sensing areas; or alternatively, at least a part of one of the pressure sensing areas is overlapped with at least a part of one of the temperature sensing areas.

7. The temperature and pressure sensor according to claim 3, wherein one of the pressure sensing areas and one of the temperature sensing areas constituting one sensing area, and the substrate is provided with a plurality of sensing areas.

8. The temperature and pressure sensor according to claim 3, wherein any one of the plurality of first sensing resistors and any one of the plurality of second sensing resistors are one selected from a group consisting of a metal film resistor, a strain gauge resistor, a semiconductor resistor, a ceramic resistor, and a conductive polymer resistor, and the plurality of first sensing resistors are the same as or different from the plurality of second sensing resistors.

9. An electronic device, comprising an object to be detected and the temperature and pressure sensor according to claim 1, wherein the substrate is arranged to abut against a surface of the object to be detected.

10. The electronic device according to claim 9, wherein the substrate is adhered with a surface of the object to be detected.

11. The electronic device according to claim 9, wherein the substrate is welded to a surface of the object to be detected.

12. The temperature and pressure sensor according to claim 1, wherein two opposite surfaces of the pressure sensing area are provided with one of the plurality of first sensing resistors respectively, two of the plurality of first sensing resistors located on the two opposite surfaces of the pressure sensing area are oppositely arranged, and the pressure detection circuit is a voltage dividing circuit constituted by connecting the two of the plurality of first sensing resistors in the pressure sensing area in series; or alternatively, two opposite surfaces of the pressure sensing area are provided with one of the plurality of first sensing resistors respectively, two of the plurality of first sensing resistors located on the two opposite surfaces of the pressure sensing area are oppositely arranged, and the pressure detection circuit is a shunt circuit constituted by connecting the two of the plurality of first sensing resistors in the pressure sensing area in parallel; or alternatively, two opposite surfaces of the pressure sensing area are provided with one of the plurality of first sensing resistors respectively, two of the plurality of first sensing resistors located on the two opposite surfaces of the pressure sensing area are oppositely arranged, and the pressure detection circuit is a bridge circuit constituted by electrically connecting two reference resistors and the two of the plurality of first sensing resistors in the pressure sensing area; or alternatively, two opposite surfaces of the pressure sensing area are provided with two of the plurality of first sensing resistors respectively, the two of the plurality of first sensing resistors are oppositely arranged, the pressure detection circuit is a bridge circuit constituted by electrically connecting four first sensing resistors in the pressure sensing area, wherein every two of the plurality of first sensing resistors located on a same surface of the pressure sensing area are served as one pair of opposite bridge arms of the bridge circuit; or alternatively, the two opposite surfaces of the pressure sensing area are provided with one of the plurality of first sensing resistors respectively, two of the plurality of first sensing resistors located on the two opposite surfaces of the pressure sensing area are oppositely arranged, and the pressure detection circuit comprises a third resistance measuring circuit configured to measure a resistance value of one of the two of the plurality of first sensing resistors and a fourth resistance measuring circuit configured to measure a resistance value of the other one of the two of the plurality of first sensing resistors.

13. The temperature and pressure sensor according to claim 1, wherein the at least one pressure sensing area is arranged to be adjacent to the at least one temperature sensing area; or alternatively, at least a part of the at least one pressure sensing area is overlapped with at least a part of the at least one temperature sensing area.

14. The temperature and pressure sensor according to claim 1, wherein one of the pressure sensing areas and one of the temperature sensing areas constituting one sensing area, and the substrate is provided with a plurality of sensing areas.

15. The temperature and pressure sensor according to claim 1, wherein any one of the plurality of first sensing resistors and any one of the plurality of second sensing resistors are one selected from a group consisting of a metal film resistor, a strain gauge resistor, a semiconductor resistor, a ceramic resistor, and a conductive polymer resistor, and the plurality of first sensing resistors are the same as or different from the plurality of second sensing resistors.

* * * * *